April 29, 1958 — F. M. LE TARTE — 2,832,610
TRACTION MECHANISM FOR TRACTOR-TRAILERS
Filed Feb. 3, 1956 — 2 Sheets-Sheet 1
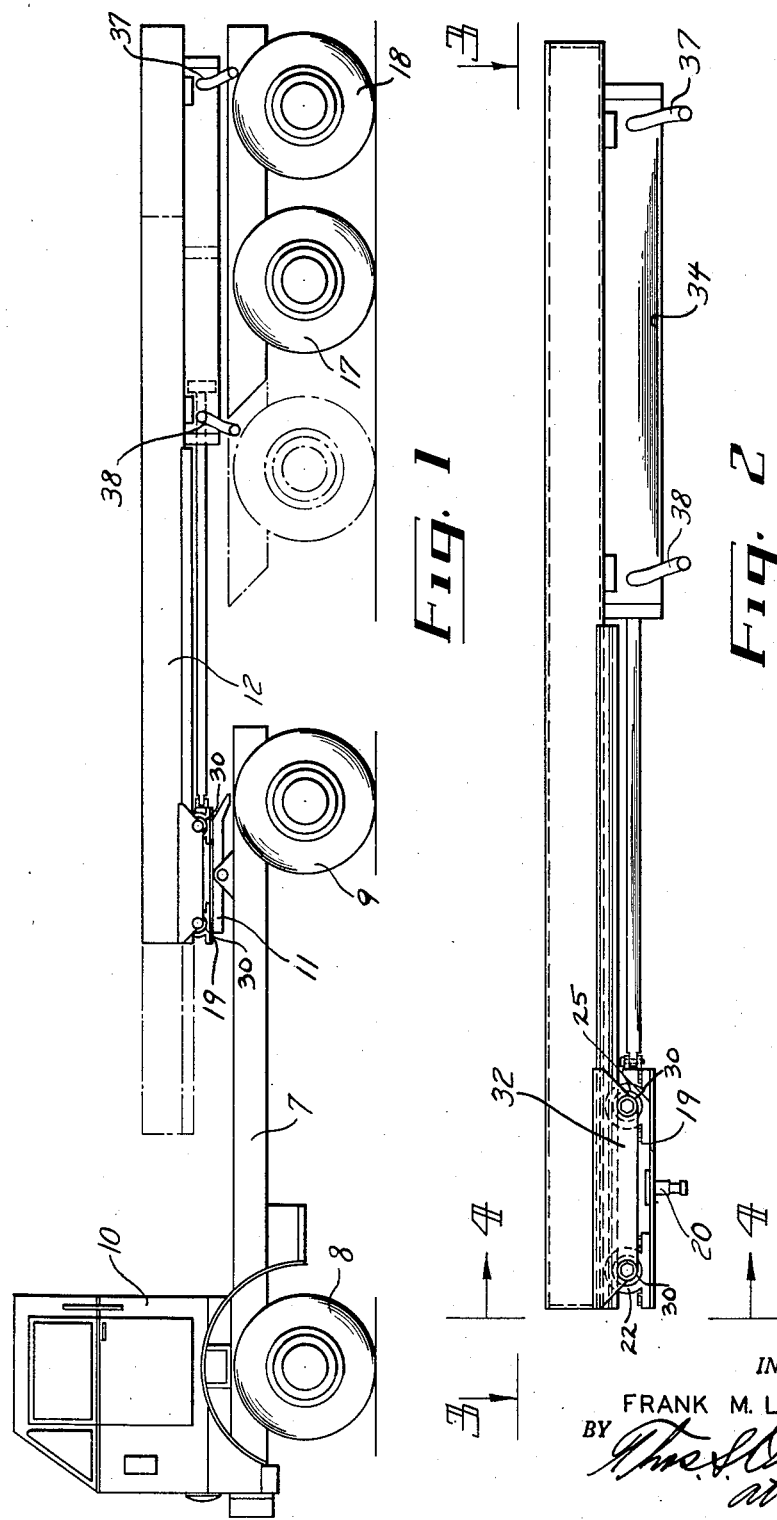
INVENTOR.
FRANK M. LE TARTE April 29, 1958     F. M. LE TARTE     2,832,610
TRACTION MECHANISM FOR TRACTOR-TRAILERS
Filed Feb. 3, 1956     2 Sheets-Sheet 2
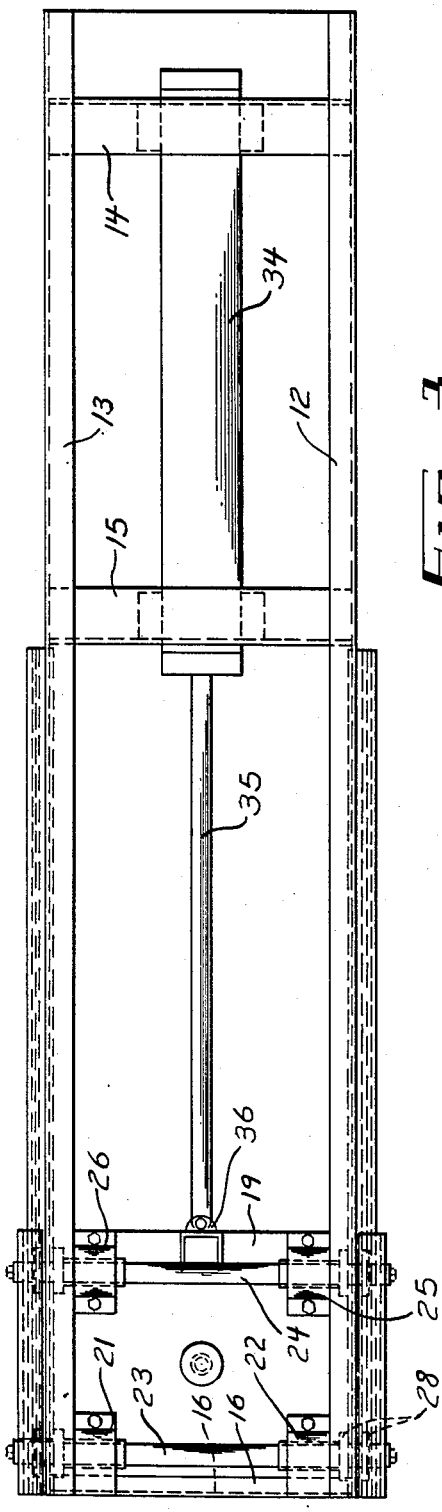
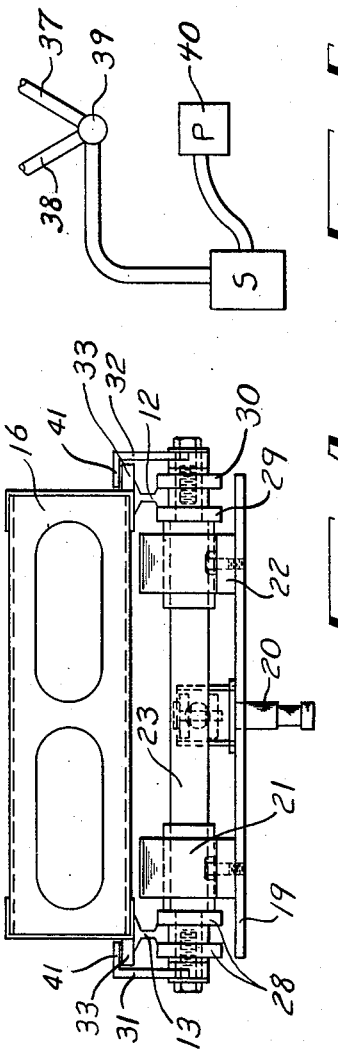
INVENTOR.
FRANK M. LE TARTE United States Patent Office 2,832,610
Patented Apr. 29, 1958

2,832,610

TRACTION MECHANISM FOR TRACTOR-TRAILERS

Frank M. Le Tarte, St. Clair Shores, Mich.

Application February 3, 1956, Serial No. 563,263

6 Claims. (Cl. 280—405)

My invention relates to a new and useful improvement in a traction mechanism adapted for use primarily in connection with vehicles consisting of a tractor and a truck trailer in which the trailer may be detached from the tractor. Experience has shown that frequently in moving into position at a dock or warehouse for loading or unloading, rough terrain will be encountered in which there are frequently formed ruts or depressions. The result is that frequently the truck and trailer become stuck.

It is an object of the present invention to provide a mechanism whereby when the tractor or trailer become stuck, one of the parts, either the tractor or the trailer, is locked in fixed position and power is applied to the part which has been stuck to move it relatively to the fixed part, thus moving it out of the rut or depression in which it has become lodged.

Another object of the invention is the provision of a hydraulic machine consisting of a piston and a cylinder, one part of which is connected to the tractor and the other part to the trailer so that upon operating the hydraulic mechanism, the two parts may be drawn toward each other.

Another object of the invention is the provision of a mechanism of this type which is economical of manufacture, durable, compact, easily and quickly operated and highly efficient in use.

Other objects will appear hereinafter.

It is recognized that various modifications and changes may be made in the detail of structure illustrated without departing from the invention, and it is intended that the present disclosure shall be considered to be but the preferred embodiment.

Forming a part of this application are drawings in which,

Fig. 1 is a side elevational view of the invention applied to a tractor;

Fig. 2 is a side elevational view of the invention with parts of the trailer removed;

Fig. 3 is a top plan view taken on line 3—3 of Fig. 2;

Fig. 4 is a front elevational view taken on line 4—4 of Fig. 2.

Fig. 5 is a diagrammatic view of the hydraulic circuit of the invention.

In the drawings I have indicated the chassis 7 of a tractor having traction wheels 8 and 9, and provided with the cab 10. This tractor is provided with a fifth wheel 11 to which the forward end of the trailer may be attached. This trailer is shown without the body mounted thereon and is indicated as comprising chassis rails 12 and 13 connected by the cross bars 14, 15 and 16. The chassis is provided with traction wheels 17 and 18, all constructed in the usual manner.

An anchor plate 19 is provided with a downwardly projecting pin 20 which engages in the slot or opening formed in the fifth wheel. Rotatably mounted in bearings 21 and 22 which are fixedly mounted on the plate 19, is a shaft 23. A similar shaft 24 is rotatably mounted in the bearings 25 and 26. At one end of each of these shafts is rotatably mounted a pair of guide trolley wheels or rollers 28 which are spaced apart and between which engages a chassis rail 13. A similar pair of guide trolley wheels or rollers 29 and 30 is mounted on the opposite end of each of the shafts or axles 23 and 24 and embrace the chassis rail 12. The front end of the trailer chassis rails 12 and 13 are supported by the rotatable shafts 23 and 24.

Supported by each of these shafts 23 and 24 is an L-shaped guide plate 31 positioned at one side of the vehicle and an L-shaped guide plate 32 positioned at the opposite side of the vehicle. The foot 41 of these L-shaped guide plates overlies a flange 33 projecting outwardly from the chassis rails 12 and 13.

Mounted on the chassis of the vehicle is a hydraulic cylinder 34 in which is slideably mounted a piston connected to the piston rod 35. The outer end of this piston rod 35 is connected to the lug 36 fixedly mounted on the plate 19. This cylinder is connected at its opposite ends by the conduits 37 and 38 through a valve 39 to a source of liquid under pressure, such as the pump 40. This pump 40 and the valve 39 may be positioned at any desired location on the vehicle and preferably at a position in the cab which would be accessible to the operator of the vehicle. The pump 40 may be operated in any suitable manner such as by a power take off or by a separate motor for driving the same.

In Fig. 1 I have shown the vehicle in its normal operating form or position. Should the wheels 17 and 18 become lodged in an obstruction which would cause the vehicle to be moored, the operator would then lock the wheels 8 and 9. When this is done, the pump 40 would be operated and the valve 39 turned to deliver the fluid through the pipe 38 into the cylinder 34. This would cause the cylinder and its connected parts to move to the left of Fig. 1, moving the trailer to the dotted line position shown in Fig. 1. This would move the wheels 17 and 18 out of their "stuck" position. However, if necessary to move the same a greater distance, the wheels 17 and 18 could then be locked with their brakes and the tractor portion moved forwardly or to the left of Fig. 1 and the same operation repeated.

Likewise should the wheels of the tractor become stuck, the wheels 17 and 18 may be locked and the hydraulic mechanism reversed in its operation to move the parts into the relative position shown in dotted lines in Fig. 1, but in this instance the tractor would approach the trailer.

Experience has shown that a mechanism constructed in this manner is very efficient for the uses and purposes intended.

What I claim is:

1. In combination a tractor, a chassis on said tractor, traction wheels mounted on said chassis; a fifth wheel carried by said chassis; a trailer comprising a chassis, traction wheels on said trailer chassis adjacent the rear end thereof, the forward end of said trailer chassis including a pair of laterally spaced apart longitudinally extended side rails overlying said fifth wheel; an anchor plate detachably mounted on said fifth wheel; a pair of spaced apart shafts rotatably mounted on said anchor plate and being transversely disposed relative to said rails; said rails being movably supported by said shafts; a hydraulic cylinder mounted on said trailer chassis, a piston slideably mounted in said cylinder; a piston rod projecting forwardly from said cylinder and connected at its outer end to said anchor plate; a guide plate mounted on each end of said shafts at opposite sides of said anchor plate; and a guide member on opposite sides of said trailer chassis cooperating with said guide plates, said trailer being movable toward said tractor upon movement of said piston rod inwardly of said cylinder and movable rearwardly of said tractor upon movement of said piston rod outwardly of said cylinder.

2. In combination a tractor, a chassis on said tractor, traction wheels mounted on said chassis; a fifth wheel carried by said chassis; a trailer comprising a chassis, traction wheels on said trailer chassis adjacent the rear end thereof, the forward end of said trailer chassis including a pair of laterally spaced apart longitudinally extended side rails overlying said fifth wheel; an anchor plate detachably mounted on said fifth wheel; a pair of spaced apart shafts rotatably mounted on said anchor plate and being transversely disposed relative to said rails; said rails being movably supported by said shafts; a hydraulic cylinder mounted on said trailer chassis, a piston slideably mounted in said cylinder; a piston rod projecting forwardly from said cylinder and connected at its outer end to said anchor plate; a guide plate mounted on each end of said shafts at opposite sides of said anchor plate; a guide member on opposite sides of said trailer chassis cooperating with said guide plates, said trailer being movable toward said tractor upon movement of said piston rod inwardly of said cylinder and movable rearwardly of said tractor upon movement of said piston rod outwardly of said cylinder; a pair of conduits, one communicating with the cylinder adjacent its rear end and the other with the cylinder adjacent its forward end for delivering liquid under pressure into said cylinder; and a control valve for controlling the flow of liquid into either of said conduits.

3. In combination a tractor, a chassis on said tractor, traction wheels mounted on said chassis; a fifth wheel carried by said chassis; a trailer comprising a chassis, traction wheels on said trailer chassis adjacent the rear end thereof, the forward end of said trailer chassis including a pair of laterally spaced apart longitudinally extended side rails overlying said fifth wheel; an anchor plate detachably mounted on said fifth wheel; a pair of spaced apart shafts rotatably mounted on said anchor plate and being transversely disposed relative to said rails; said rails being movably supported by said shafts; a hydraulic cylinder mounted on said trailer chassis, a piston slideably mounted in said cylinder; a piston rod projecting forwardly from said cylinder and connected at its outer end to said anchor plate; a guide plate mounted on each end of said shafts at opposite sides of said anchor plate; a guide member on opposite sides of said trailer chassis cooperating with said guide plates, said trailer being movable toward said tractor upon movement of said piston rod inwardly of said cylinder and movable rearwardly of said tractor upon movement of said piston rod outwardly of said cylinder; a pair of conduits, one communicating with the cylinder adjacent its rear end and the other with the cylinder adjacent its forward end for delivering liquid under pressure into said cylinder; a control valve for controlling the flow of liquid into either of said conduits; and roller members on said shafts for engaging the sides of said trailer chassis rails for guiding said rails upon relative movement of said trailer and said tractor.

4. In combination a tractor, a chassis on said tractor, traction wheels mounted on said chassis; a fifth wheel carried by said chassis; a trailer comprising a chassis, traction wheels on said trailer chassis adjacent the rear end thereof, the forward end of said trailer chassis including a pair of laterally spaced apart longitudinally extended side rails overlying said fifth wheel; an anchor plate detachably mounted on said fifth wheel; a pair of spaced apart shafts rotatably mounted on said anchor plate and being transversely disposed relative to said rails; said rails being movably supported by said shafts; a hydraulic cylinder mounted on said trailer chassis, a piston slideably mounted in said cylinder; a piston rod projecting forwardly from said cylinder and connected at its outer end to said anchor plate; a guide plate mounted on each end of said shafts at opposite sides of said anchor plate; a guide member on opposite sides of said trailer chassis cooperating with said guide plates, said trailer being movable toward said tractor upon movement of said piston rod inwardly of said cylinder and movable rearwardly of said tractor upon movement of said piston rod outwardly of said cylinder; a pair of conduits, one communicating with the cylinder adjacent its rear end and the other with the cylinder adjacent its forward end for delivering liquid under pressure into said cylinder; a control valve for controlling the flow of liquid into either of said conduits; and rotatable guide members mounted on said shafts on said anchor plate for engaging opposite sides of the trailer chassis rails and being rotatable upon relative movement of said trailer and tractor.

5. In combination, a tractor having a chassis; traction wheels mounted on said chassis and supporting the same; a fifth wheel mounted on said chassis; a trailer comprising a chassis embodying oppositely disposed side rails; traction wheels supporting said trailer chassis adjacent its rear end; an anchor plate detachably mounted on said fifth wheel; a pair of spaced apart shafts rotatably mounted on said anchor plate; the chassis rails of said trailer overlying said anchor plate and being movably supported by said shafts; guide members supported by said shafts and engageable with the trailer chassis at opposite sides; and a hydraulic mechanism mounted on said trailer chassis and connected to said tractor chassis and operable for moving said trailer chassis forwardly and rearwardly of said tractor.

6. In combination a tractor having a chassis; traction wheels mounted on said chassis and supporting the same; a fifth wheel mounted on said chassis; a trailer comprising a chassis embodying oppositely disposed side rails; traction wheels supporting said trailer chassis adjacent its rear end; an anchor plate detachably mounted on said fifth wheel; a pair of spaced apart shafts rotatably mounted on said anchor plate; the chassis rails of said trailer overlying said anchor plate and being movably supported by said shafts; guide members supported by said shafts and engageable with the trailer chassis at opposite sides; a hydraulic mechanism mounted on said trailer chassis and connected to said tractor chassis and operable for moving said trailer chassis forwardly and rearwardly of said tractor; and roller members carried by said shafts engageable with the side rails of said trailer chassis and rotatable upon relative movement of said trailer chassis and said tractor.

References Cited in the file of this patent

UNITED STATES PATENTS

| 1,887,118 | Collinge | Nov. 8, 1932 |
| 2,553,959 | Cook | May 22, 1951 |
| 2,717,707 | Martin | Sept. 13, 1955 |

FOREIGN PATENTS

| 127,473 | Austria | Mar. 25, 1932 |